(12) United States Patent
Lin

(10) Patent No.: US 12,551,792 B2
(45) Date of Patent: Feb. 17, 2026

(54) SYSTEMS AND METHODS FOR GAMIFICATION IN A META VERSE

(71) Applicant: Honda Motor Co., Ltd., Tokyo (JP)

(72) Inventor: Christine Lin, Manhattan Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 330 days.

(21) Appl. No.: 18/184,864

(22) Filed: Mar. 16, 2023

(65) Prior Publication Data

US 2024/0307771 A1 Sep. 19, 2024

(51) Int. Cl.
*A63F 13/52* (2014.01)
*A63F 13/655* (2014.01)
*A63F 13/798* (2014.01)

(52) U.S. Cl.
CPC ............ *A63F 13/52* (2014.09); *A63F 13/655* (2014.09); *A63F 13/798* (2014.09)

(58) Field of Classification Search
CPC ....... A63F 13/52; A63F 13/655; A63F 13/798
USPC .......................................................... 463/31
See application file for complete search history.

(56) References Cited

U.S. PATENT DOCUMENTS

| | | | | |
|---|---|---|---|---|
| 4,214,381 A * | 7/1980 | Clark | ...................... | G09B 9/04 434/67 |
| 9,434,226 B1 * | 9/2016 | Trigo | ...................... | B60R 19/48 |
| 10,474,450 B1 | 11/2019 | Chim et al. | | |
| 10,768,924 B2 | 9/2020 | Short et al. | | |
| 2002/0061804 A1 * | 5/2002 | Hasegawa | .......... | A63B 22/0005 482/57 |
| 2002/0115043 A1 * | 8/2002 | Baker | ...................... | G09B 9/08 434/30 |
| 2007/0009862 A1 * | 1/2007 | Quinn | ...................... | G09B 9/00 434/38 |
| 2008/0300730 A1 * | 12/2008 | Cleary | ...................... | A63G 7/00 701/1 |
| 2010/0279255 A1 * | 11/2010 | Williams, II | ............ | G09B 9/14 434/29 |
| 2011/0192241 A1 * | 8/2011 | Aiki | .................. | G01M 17/0078 73/865.3 |

(Continued)

FOREIGN PATENT DOCUMENTS

| | | |
|---|---|---|
| CN | 113370922 A | 9/2021 |
| CN | 113687853 A | 11/2021 |

(Continued)

*Primary Examiner* — Malina D. Blaise
(74) *Attorney, Agent, or Firm* — Rankin, Hill & Clark LLP

(57) ABSTRACT

Systems and methods for gamification in a metaverse are provided herein. In one embodiment, a method includes generating a metaverse environment with a metaverse application at a client computer of a user. The metaverse environment includes a virtual user vehicle that replicates a physical user vehicle associated with the user. The virtual user vehicle is associated with a number of virtual properties. The method also includes receiving an interaction that alters a virtual property of the number of virtual properties at the client computer. The method further includes assigning a community value to the interaction based on a comparative baseline. The method yet further includes identifying a physical property of the physical user vehicle corresponding to the virtual property of the number of virtual properties. The method continues altering the physical property of the physical user vehicle based on the community value.

17 Claims, 6 Drawing Sheets

(56) References Cited

U.S. PATENT DOCUMENTS

| | | | | |
|---|---|---|---|---|
| 2012/0282588 A1* | 11/2012 | Stevens | | G09B 9/04 |
| | | | | 434/365 |
| 2012/0301853 A1* | 11/2012 | Garvis | | G09B 9/14 |
| | | | | 434/58 |
| 2013/0238198 A1* | 9/2013 | Prentice | | B62D 35/02 |
| | | | | 296/180.1 |
| 2021/0250107 A1 | 8/2021 | Kildal | | |
| 2022/0242450 A1* | 8/2022 | Sokolov | | G06Q 10/0635 |
| 2022/0326931 A1 | 10/2022 | Choi | | |
| 2022/0398652 A1* | 12/2022 | Armstrong | | G06Q 30/0643 |
| 2023/0226454 A1* | 7/2023 | Chirokov | | A63F 13/245 |
| | | | | 463/2 |
| 2023/0264108 A1* | 8/2023 | Wickman | | A63F 13/65 |
| | | | | 463/40 |
| 2023/0410159 A1* | 12/2023 | Zavesky | | G06Q 30/0201 |
| 2024/0003693 A1* | 1/2024 | Williams | | G01C 21/3617 |
| 2024/0056922 A1* | 2/2024 | Cui | | H04W 36/22 |
| 2024/0087272 A1* | 3/2024 | Benzies | | A63F 13/52 |
| 2024/0097847 A1* | 3/2024 | Kim | | H04W 72/0453 |
| 2024/0177196 A1* | 5/2024 | Canney | | A63F 13/792 |
| 2024/0181349 A1* | 6/2024 | Lee | | A63F 13/35 |
| 2024/0220789 A1* | 7/2024 | Ferguson | | G06N 3/08 |
| 2024/0362867 A1* | 10/2024 | Sui | | G06F 3/011 |
| 2024/0367795 A1* | 11/2024 | Kasody | | B64D 11/0015 |
| 2024/0394788 A1* | 11/2024 | Armstrong | | G06N 3/006 |
| 2024/0403945 A1* | 12/2024 | Kim | | G06Q 30/0643 |
| 2024/0404404 A1* | 12/2024 | Rouhi | | G08G 1/012 |
| 2025/0068380 A1* | 2/2025 | Shimizu | | G06F 3/165 |

FOREIGN PATENT DOCUMENTS

| | | | | |
|---|---|---|---|---|
| CN | 113760774 A | 12/2021 | | |
| CN | 114546445 | 5/2022 | | |
| EP | 3584703 A1 | 12/2019 | | |
| WO | WO-2017095852 A1 * | 6/2017 | | A63F 13/25 |

* cited by examiner

SYSTEMS AND METHODS FOR GAMIFICATION IN A META VERSE

BACKGROUND

In the metaverse, a virtual world may be generated by a computer that simulates an environment. This environment may be presented in two-dimensional (2D) or three dimensional (3D) formats and may mimic a defined environment through visual and audio cues. For example, the virtual world may be a forest with computer generated trees, streams, and wildlife. Sounds may include wind blowing and birds chirping. City landscapes may also be created which simulate a densely populated city such as New York City. The virtual worlds may allow for a user to inhabit, traverse, and interact with others within the created environments. The user may immerse themselves through virtual reality (VR) and augmented reality (AR) headsets. Avatars, which are personas of the user, may be placed within the metaverse so that the user actually feels that they are within the environment.

BRIEF DESCRIPTION

According to one aspect, a system is provided that includes a processor and a memory storing instructions. When executed by the processor, the instructions cause the processor to generate a metaverse environment with a metaverse application at a client computer of a user. The metaverse environment includes a virtual user vehicle that replicates a physical user vehicle associated with the user. The virtual user vehicle is associated with a number of virtual properties. The instructions also cause the processor to receive an interaction that alters a virtual property of the number of virtual properties at the client computer. The instructions further cause the processor to assign a community value to the interaction based on a comparative baseline. The instructions yet further cause the processor to identify a physical property of the physical user vehicle corresponding to the virtual property of the number of virtual properties. The instructions also cause the processor to alter the physical property of the physical user vehicle based on the community value.

According to another aspect, a computer-implemented method for gamification in a metaverse is provided. The computer-implemented method includes a method includes generating a metaverse environment with a metaverse application at a client computer of a user. The metaverse environment includes a virtual user vehicle that replicates a physical user vehicle associated with the user. The virtual user vehicle is associated with a number of virtual properties. The computer-implemented method also includes receiving an interaction that alters a virtual property of the number of virtual properties at the client computer. The computer-implemented method further includes assigning a community value to the interaction based on a comparative baseline. The computer-implemented method yet further includes identifying a physical property of the physical user vehicle corresponding to the virtual property of the number of virtual properties. The computer-implemented method continues altering the physical property of the physical user vehicle based on the community value.

According to yet another aspect, a non-transitory computer readable storage medium storing instructions that when executed by a computer, which includes a processor, perform a method for gamification in a metaverse. The method includes generating a metaverse environment with a metaverse application at a client computer of a user. The metaverse environment includes a virtual user vehicle that replicates a physical user vehicle associated with the user. The virtual user vehicle is associated with a number of virtual properties. The method also includes receiving an interaction that alters a virtual property of the number of virtual properties at the client computer. The method further includes assigning a community value to the interaction based on a comparative baseline. The method yet further includes identifying a physical property of the physical user vehicle corresponding to the virtual property of the number of virtual properties. The method continues altering the physical property of the physical user vehicle based on the community value.

DETAILED DESCRIPTION

Figure 1:
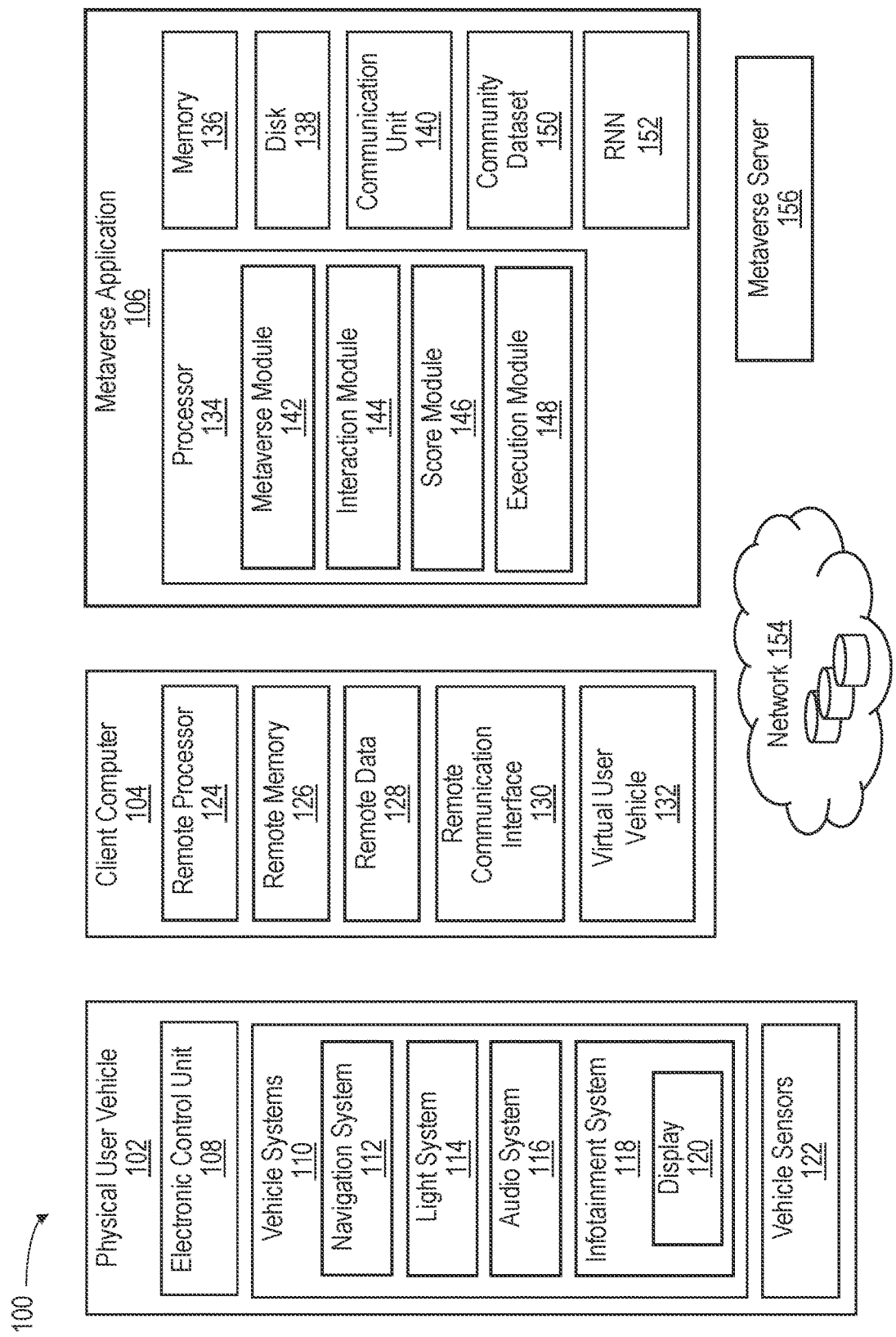
FIG. 1 is an exemplary component diagram of a system for gamification in a metaverse, according to one aspect.

The present disclosure provides systems and methods for gamification in a metaverse. A user may access a virtual user vehicle in the metaverse that replicates a physical user vehicle in the physical world. The user is able to interact with the virtual user vehicle. For example, the user may be able to apply and/or alter virtual properties of the virtual user vehicle. The virtual properties may represent cosmetic features (e.g., body color, headlight color, etc.) and experiential features (e.g., in-cabin lighting, soundscapes, etc.), among others. When the virtual properties are applied or altered to the virtual user vehicle, the virtual user vehicle may change the appearance, ambiance, etc. accordingly.

Furthermore, the interaction that applies or alters a virtual property of the virtual user vehicle may similarly apply or alter the physical user vehicle. For example, the virtual property may correspond a physical property of the physical user vehicle. In response to the interaction, the vehicle systems of the physical user vehicle may cause the physical property to be applied to the physical user vehicle based on a community value. The community value is assigned to the interaction based on a comparative baseline.

The community value is a comparative structure that allows the changes to the virtual user vehicle to be gauged. In one embodiment, the virtual property may be assigned a property level of a plurality of property levels. For example, the virtual property may be assigned a level 3 out of 5 total property levels. Then, the community value may be calculated based on a comparative baseline that is a ratio of the property level to the total number of property levels. In another embodiment, the user may be able to compare their virtual user vehicle to others in the metaverse. For example, the metaverse environment may accessible by participants having virtual participant vehicles. The comparative baseline is based on the property level of the virtual property associated with the virtual user vehicle relative to the property levels of the virtual participant vehicles. In yet another embodiment, each participant may have a virtual participant score based on property levels associated with the virtual participant vehicles. The comparative baseline may then be based on the virtual user score relative to the virtual participant scores of the participants. In this manner, the community value may be calculated to gamify the interaction between the user and the virtual user vehicle by acting as a comparative gauge.

In response to the community value being calculated, the physical property of the physical user vehicle may be applied or altered based on the community value. For example, the physical property of the physical user vehicle may include causing a vehicle system of the physical user vehicle to alter the physical property of the physical user vehicle to replicate the changed appearance, ambiance, etc. of the virtual user vehicle. Different appearances or settings may be made available to the user based on the community value. Timing parameters indicating how long the physical property is maintained or when the physical property is available may also be based on the community value. Therefore, the timing, appearance, settings, etc. of the physical property being applied to the physical user vehicle may be based on the community value.

The systems and methods for gamification in a metaverse allow the user to interact with their virtual user vehicle in the metaverse in a manner that may be gauged relative to comparative baselines that reflect a plurality of levels available in the metaverse or to other participants experiencing the metaverse. Changes to the corresponding physical user vehicle in the physical world may then be made based on that gauge and act as an incentive for interacting with the virtual user vehicle.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein is a self-propelled machine that moves through or manipulates an environment. Exemplary agents may include, but is not limited to, robots, vehicles, or other self-propelled machines. The agent may be autonomously, semi-autonomously, or manually operated.

"Agent system," as used herein may include, but is not limited to, any automatic or manual systems that may be used to enhance the agent, propulsion, and/or operation. Exemplary systems include, but are not limited to: an electronic stability control system, an anti-lock brake system, a brake assist system, an automatic brake prefill system, a low speed follow system, a cruise control system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

"Client computer," as used herein, is a computing device typically having a display screen with user input (e.g., touch, keyboard) and a processor for computing. Client computers include, but are not limited to, handheld devices, mobile devices, smart phones, laptops, tablets, e-readers, smart speakers. A "client computer" may refer to a remote device that includes a processor for computing and/or a communication interface for receiving and transmitting data remotely.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "vehicle system," as used herein may include, but is not limited to, any automatic or manual systems that may be used to enhance the vehicle, driving, and/or operation. Exemplary vehicle systems include, but are not limited to: an electronic stability control system, an anti-lock brake system, a brake assist system, an automatic brake prefill system, a low speed follow system, a cruise control system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "vehicle occupant," as used herein may include, but is not limited to, one or more biological beings located in the vehicle. The vehicle occupant may be a driver or a passenger of the vehicle.

I. System Overview

FIG. 1 is a schematic view of an operating environment 100 for implementing systems and methods for gamification in a metaverse according to an exemplary embodiment. The components of the operating environment 100, as well as the components of other systems, hardware architectures, and software architectures discussed herein, may be combined, omitted, or organized into different architectures for various embodiments. The systems and methods are described with reference to vehicles for clarity. However, one of ordinary skill in the art will understand that the systems and method described herein may be applied to agents, such as robots, robotic assistants, etc.

Figure 2A:
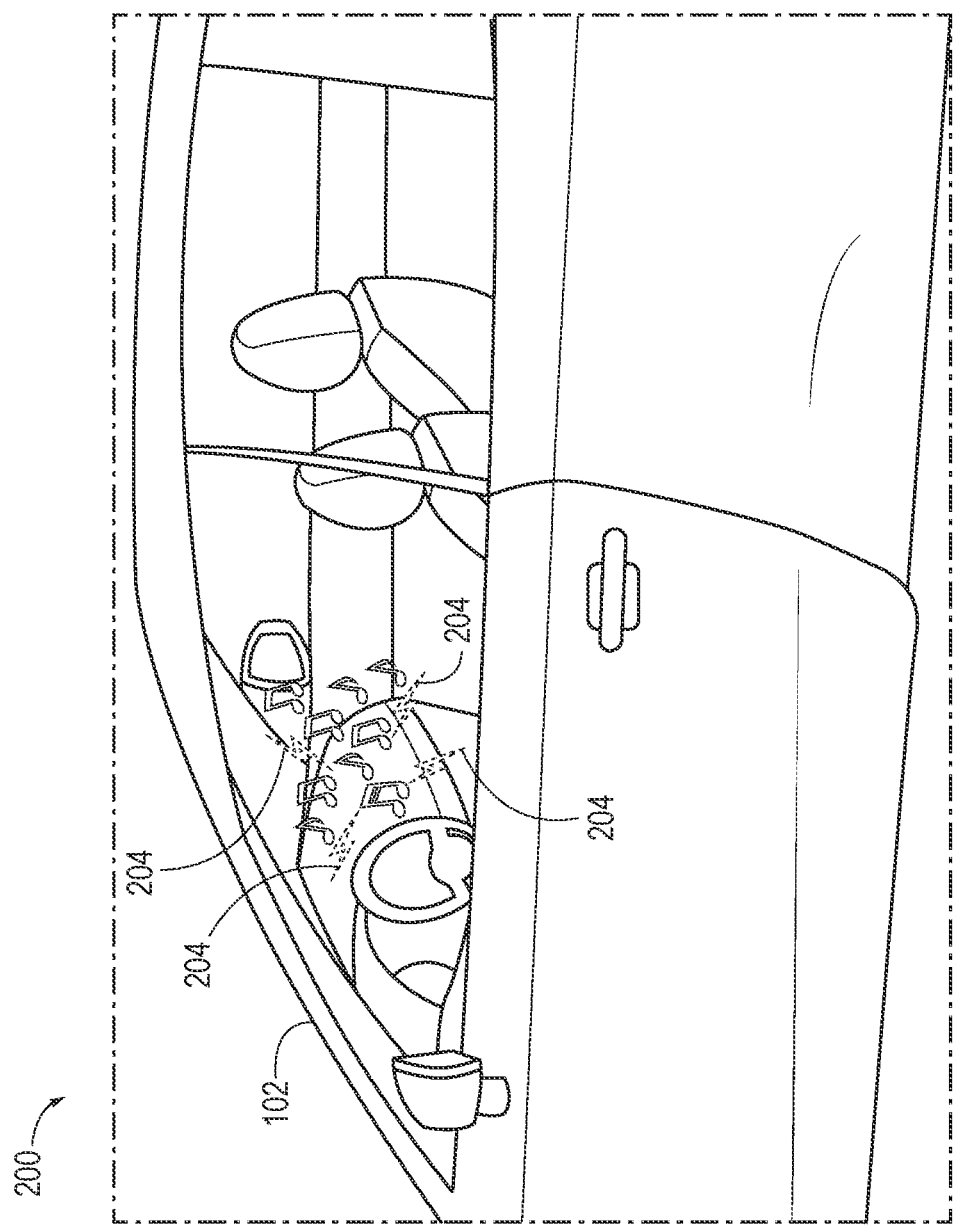
FIG. 2A is an exemplary physical user vehicle in the physical world, according to one aspect.
Figure 2B:
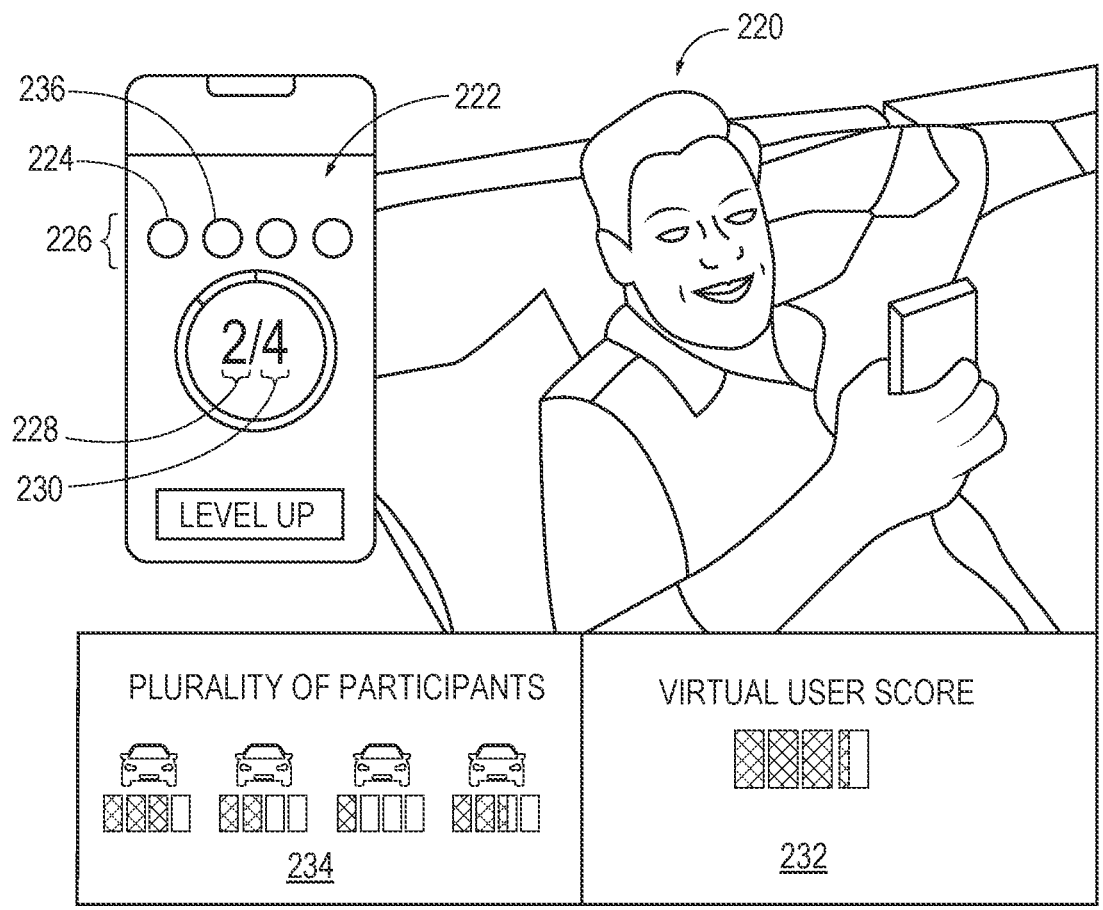
FIG. 2B is an exemplary interface of a system for gamification in a metaverse, according to one aspect.
Figure 2C:
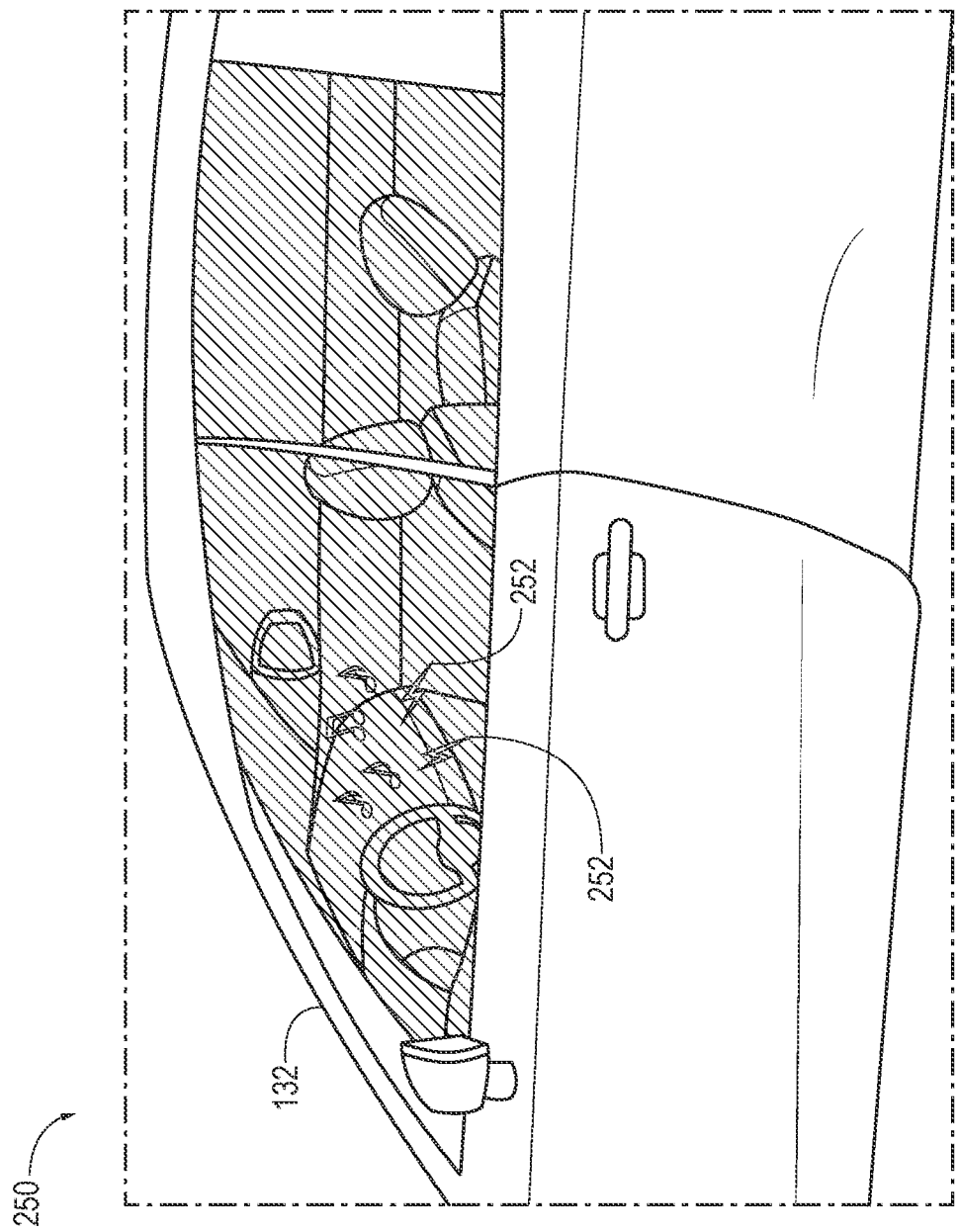
FIG. 2C is an exemplary virtual user vehicle in a metaverse environment, according to one aspect.

Generally, the operating environment 100 includes a physical user vehicle 102, a client computer 104, and a metaverse application 106. The physical user vehicle 102 is shown in the physical world 200 in FIG. 2A. The client computer 104 is shown in use with a user 220 in FIG. 2B. The virtual user vehicle 132 is shown in a metaverse environment 250 in FIG. 2C.

Returning to FIG. 1, the physical user vehicle 102 includes an electronic control unit (ECU) 108 that executes one or more applications, operating systems, vehicle system and subsystem user interfaces, among others. The ECU 108 may also execute the metaverse application 106. The metaverse application 106 may be configured to utilize a recurrent neural network (RNN) 152 to model and calculate one or more community values based on the physical user vehicle 102 a virtual user vehicle 132 in one or more interactions in the metaverse. As discussed in more detail below, the metaverse application 106 is configured to provide a comparative structure that allows the changes to the virtual user vehicle 132 to be gauged.

The metaverse environment 250 may provide a highly immersive virtual world where participants may gather to socialize, play, and work. These participants may take the form of an avatar (not shown), which may be an icon or figure representing a particular person in the metaverse. The metaverse environment 250 may encompass many types of metaverse applications, such as the metaverse application 106 among others which are coupled to the metaverse environment 250. The metaverse applications may be part of the metaverse environment 250 which allows for their plug and play capability.

The metaverse environment 250 may be executed atop a metaverse server 156. The metaverse server 156 may provide for a virtual world simulation through a software application that may be stored and executed on the client computer 104. The metaverse server 156 may facilitate tracking objects, including avatars, software agents, and virtual objects. The metaverse server 156 for the metaverse environment 250 may include an array of servers.

A specified area of the metaverse environment 250 may be simulated by a single server instance, and multiple server instances may be run on the metaverse server 156. The metaverse server 156 may include a plurality of simulation servers dedicated to physics simulation in order to manage interactions and handle interactions between participants and objects, such as the virtual user vehicle 132, in a metaverse environment 250. The metaverse application 106 may include a memory 136 and/or a disk 138 that may be dedicated to storing data related to objects and avatars in the metaverse environment 250. In particular, the stored data may include object shapes, avatar shapes and appearances, audio clips, metaverse related scripts, and other metaverse related objects.

The metaverse environment 250 may be coupled to a network 154 where client computer 104 may access the metaverse environment 250. The network 154 may communicate using a communication unit 140. The network 154 may also communicate file I/O, such as over a transmission control protocol/internet protocol (TCP/IP) network or similar communication protocol. In some embodiments, the network 154 may include two or more networks. In some embodiments, the client computer 104 may be connected directly to the metaverse server 156 via a backplane or system bus. The network 154 may include a cellular network, another type of network, or a combination of networks.

As discussed below, the metaverse application 106 may be configured to utilize various inputs that are related interactions between participants and objects, such as the virtual user vehicle 132. Such inputs maybe provided by systems, sensors, and/or components of the physical user vehicle 102, and/or the client computer 104. The metaverse application 106 may further utilize various inputs in the form of a community dataset 150 based on other participants, objects, interactions in the metaverse environment 250. The metaverse application 106 may accordingly provide a comparative structure for gamification that is configured to utilize the RNN 152 to calculate a community value for an interaction between the virtual user vehicle 132, shown in FIG. 2A and a user 220, shown in FIG. 2B. The comparative structure for gamification provided by the metaverse application 106 may provide changes to the physical user vehicle 102 based on the interaction with the virtual user vehicle 132. The community value may allow the user 220 to compare themselves with features of the metaverse environment 250, such as different property levels and other participants in the metaverse environment 250. Moreover, the user 220 may be rewarded in the physical world 200 by applying physical properties to the physical user vehicle 102 based on the community value.

While the user 220 is described with respect to one virtual user vehicle 132 and one corresponding physical user vehicle 102, it will be understood that more vehicles, virtual or physical, may be associated with the user 220. For example, the user 220 may maintain a fleet of virtual user vehicles corresponding to the physical user vehicle 102. Alternatively, the user 220 may maintain the virtual user vehicle 132 that replicates a plurality of physical user vehicles. The metaverse application 106 may include any variation in the correspondence of virtual and physical vehicles.

Referring again to FIG. 1, the components of the physical user vehicle 102, the client computer 104, and the metaverse application 106 will now be discussed. The components of the physical user vehicle 102 may be operably controlled by the ECU 108. In one or more embodiments, the ECU 108 may include a respective microprocessor, one or more application-specific integrated circuit(s) (ASIC), or other similar devices. The ECU 108 may also include respective internal processing memory, an interface circuit, and bus lines for transferring data, sending commands, and communicating with the plurality of components of the physical user vehicle 102.

The ECU 108 may also include a respective communication device (not shown) for sending data internally to components of the physical user vehicle 102 and communicating with externally hosted computing systems (e.g., external to the physical user vehicle 102). In one embodiment, the ECU 108 may be operably connected to a head unit (not shown) of the physical user vehicle 102 that may include and/or may be operably connected to one or more display device(s) 120 and one or more audio devices (not shown). In one embodiment, the display device(s) 120 may be located within the center of the dashboard of the physical user vehicle 102 or any other location within the physical user vehicle 102.

The ECU 108 may also send and receive data internally to components of the physical user vehicle 102 including one or more vehicle systems 110. The vehicle systems 110 may include, but are not limited to, any automatic or manual systems that may be used to enhance the vehicle, driving, and/or propulsion. Here, the vehicle systems 110 include a navigation system 112, a light system 114, an audio system 116, and an infotainment system 118 according to an exemplary embodiment. The navigation system 112 stores, calculates, and provides route and destination information and facilitates features like turn-by-turn directions. The light system 114 controls the lights of the vehicle to actuate, including, for example, exterior lights (e.g., turn signal lights) and/or interior lights such as the dashboard lights. The audio system 116 controls audio (e.g., audio content, volume) in the physical user vehicle 102. The infotainment system 118 provides visual information and/or entertainment.

The vehicle systems 110 include and/or are operably connected for computer communication to vehicle sensors 122. The vehicle sensors 122 provide and/or sense information associated with the physical user vehicle 102, the physical world 200, and/or the vehicle systems 110. The vehicle sensors 122 may include, but are not limited to, vehicle sensors 122 associated with the vehicle systems 110, other vehicle sensors associated with the physical user vehicle 102, and/or vehicle sensors 122. The vehicle sensors 122 may be, but are not limited to, environmental sensors, vehicle speed sensors, accelerator pedal sensors, brake sensors, throttle position sensors, wheel sensors, anti-lock brake sensors, camshaft sensors, among others. In some embodiments, the vehicle sensors 122 are incorporated with the vehicle systems 110. For example, one or more vehicle sensors 122 may be incorporated with the light system 114 to determine the color of the physical user vehicle 102 or to monitor the color scheme of the lighting in the cabin of the physical user vehicle 102. In another embodiment, the one or more vehicle sensors 122 may be incorporated with the audio system 116 to determine and/or monitor the current audio settings (e.g., volume, treble, bass, balance, etc.) of audio in the physical user vehicle 102. In an agent embodiment, the vehicle systems 110 may be agent systems.

The vehicle sensors 122 may include, but are not limited to, image sensors, such as cameras, optical sensors, radio sensors, etc. mounted to the interior or exterior of the physical user vehicle 102 and light sensors, such as light detection and ranging (LiDAR) sensors, radar, laser sensors etc. mounted to the exterior or interior of the physical user vehicle 102. Further, vehicle sensors 122 may include sensors external to the physical user vehicle 102 (accessed, for example, via the network 154), for example, external cameras, radar and laser sensors on other vehicles in a vehicle-to-vehicle network, street cameras, surveillance cameras, among others.

The vehicle sensors 122 detect characteristics of the physical user vehicle 102. Accordingly, the vehicle sensors 122 are operable to sense data and generate a data signal indicating a measurement of the sensed data. These data signals may be converted into other data formats (e.g., numerical) and/or used by the vehicle systems 110 and/or the ECU 108 to generate other data metrics and parameters. It is understood that the sensors may be any type of sensor, for example, acoustic, electric, environmental, optical, imaging, light, pressure, force, thermal, temperature, proximity, among others.

The ECU 108 is also operatively connected for computer communication to the network 154 and the client computer 104, the metaverse application 106, and the metaverse server 156. For example, the computer communication may be facilitated through a network connection (e.g., wired or wireless), a cellular data network from a portable device (not shown), a vehicle to vehicle ad-hoc network (not shown), an in-vehicle network (not shown), among others, or any combination of thereof. The network 154 is, for example, a data network, the Internet, a wide area network or a local area network. The network 154 serves as a communication medium to various remote devices (e.g., databases, web servers, remote servers, application servers, intermediary servers, client machines, other portable devices). In some embodiments, the community dataset 150 may be accessed by the ECU 108 through the network 154, and/or the network 154 may access the community dataset 150. Thus, in some embodiments, the ECU 108 may obtain data by accessing the community dataset 150 via the network 154. In one embodiment, the ECU 108 may access or host the metaverse application 106.

The client computer 104 may include a remote processor 124, a remote memory 126, remote data 128, and a communication interface 130. For example, the communication interface 130 may send or receive the remote data 128 to the physical user vehicle 102, the metaverse application 106, and/or the metaverse server 156 via the network 154. The client computer 104 may further include a display 222 shown in FIG. 2B. In one embodiment, the client computer 104 may additionally or alternatively access or host the metaverse application 106. For example, the user 220 may access the metaverse application 106 via the display 222.

The general functionality of the metaverse application 106 will now be discussed. In an exemplary embodiment, the metaverse application 106 may be stored on the memory 136 and executed by the processor 134 of an external server, such as the metaverse server 156. The processor 134 of metaverse application 106 may include a metaverse module 142, an interaction module 144, a score module 146, and an execution module 148. However, it is to be appreciated that the metaverse application 106 may include one or more additional modules and/or sub-modules that are included in addition to the modules 142-148. In another embodiment, the metaverse application 106 may be stored on a storage unit (not shown) of the physical user vehicle 102 and/or the client computer 104 and may be executed by the ECU 108 and/or the remote processor 124, respectively. Methods and examples describing process steps that are executed by the modules 142-148 of the metaverse application 106 will now be described in more detail.

II. Methods

Figure 3:
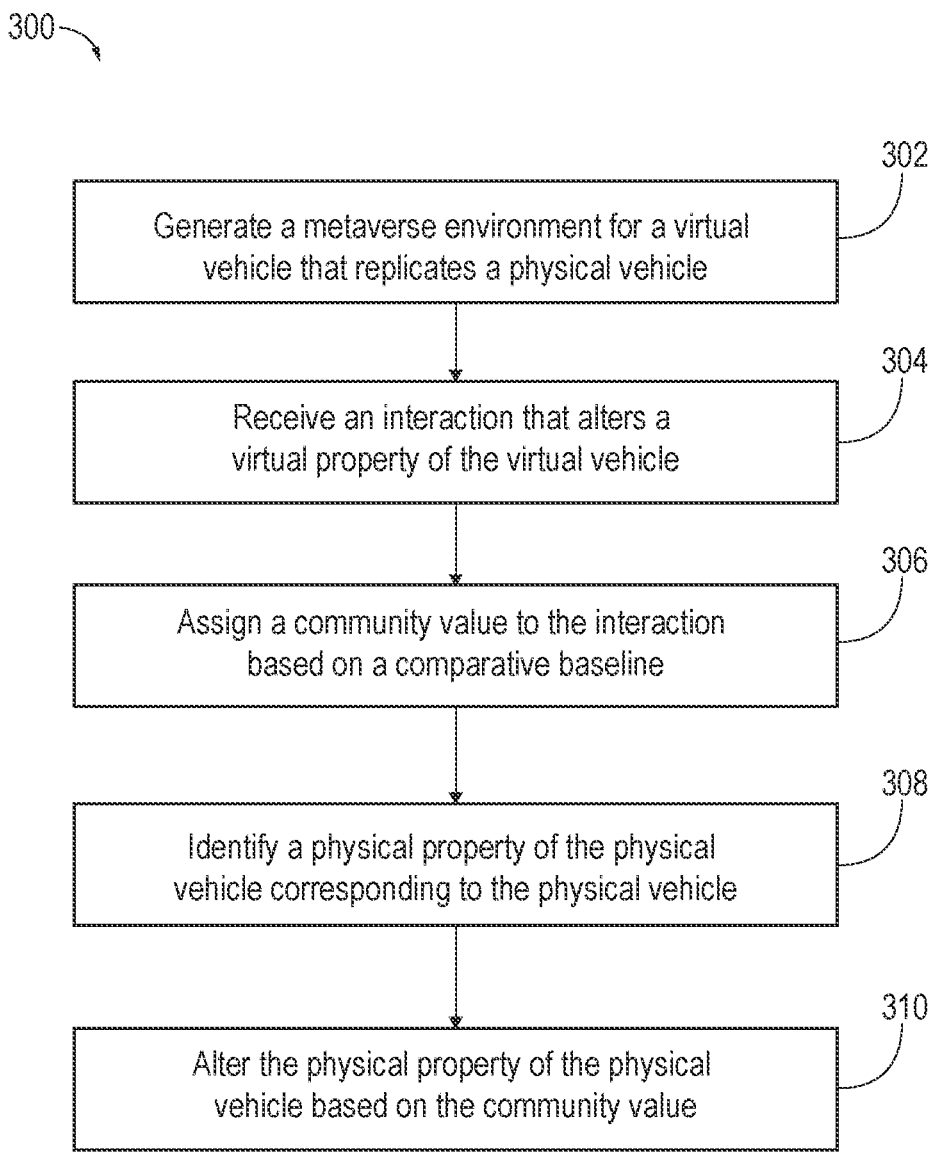
FIG. 3 is an exemplary process flow of a method for gamification in a metaverse, according to one aspect.

Referring now to FIG. 3, a method 300 for gamification in a metaverse will now be described according to an exemplary embodiment. FIG. 3 will also be described with reference to FIGS. 1, 2, and 4. For simplicity, the method 300 will be described as a sequence of elements, but it is understood that the elements of the method 300 may be organized into different architectures, blocks, stages, and/or processes.

At block 302, the method 300 includes the metaverse module 142 generating a metaverse environment 250 with a metaverse application 106 at a client computer 104 of a user 220. The metaverse environment 250 includes a virtual user vehicle 132 that replicates the physical user vehicle 102 associated with the user 220. The physical user vehicle 102 may be scanned into the metaverse environment 250 based on image data from a camera that may be associated with the vehicle sensors 122. The physical user vehicle 102 may be continually or periodically scanned into the metaverse environment 250 to show the physical user vehicle 102 in real-time. Multiple cameras may be used to capture 3D effects. The image data may be verified with remote image data from external sources, such as from image data from roadside equipment. Information about a model, year made, and/or title owner may be sent as vehicle information with the image data from the vehicle sensors 122.

The interior (i.e., the cabin) of the physical user vehicle 102 may be scanned as well. The scan may include image data with information about the current state of the interior of the physical user vehicle 102. For example, the image data may include whether cabin lights are illuminated and, if so, the color of the illumination. The image data may also indicate the location and identify of a vehicle occupant. For example, the image data may be used with facial recognition to identify the user 220 and the location of the user 220 in the physical user vehicle 102. Image data of the engine compartment may also be captured. The image data may be received by the remote memory 126 and/or the memory 136 of the client computer 104 and/or the metaverse application 106, respectively.

The metaverse module 142 may generate the metaverse environment 250 with the virtual user vehicle 132 that replicates the physical user vehicle 102. The virtual user vehicle 132 within the metaverse environment 250 may be generated based on the sensor data from the vehicle sensors 122, such as the image data. Other parameters that may be scanned from the physical user vehicle 102 may include performance factors, such as running parameters of the physical user vehicle 102. In this manner, the metaverse module 142 replicates the physical user vehicle 102 in the metaverse environment 250

The virtual user vehicle 132 is associated with a number of virtual properties 226. The virtual properties 226 may represent cosmetic features (e.g., body color, headlight color, etc.) and experiential features (e.g., in-cabin lighting, soundscapes, etc.), among others that may be applied or altered to the virtual user vehicle 132. For example, the virtual properties 226 may include individual light settings (e.g., on, off, dimmed, 30% illuminated, the color of the light, etc.) for the virtual user vehicle 132. The virtual properties 226 may also include audio setting (e.g., music playing, type of music, speaker balance, volume, treble, bass, etc.) for the virtual user vehicle 132. The virtual properties 226 may additionally alter exterior aspects of the virtual user vehicle 132. For example, a virtual property 224 of the virtual properties 226 may allow the user 220 to select a color of the exterior of the virtual user vehicle 132 or define a level of tinting of the windows of the virtual user vehicle 132.

The interaction may include multiple virtual properties from the virtual properties 226. The virtual properties 226 may include ambiance modes that change a plurality of the individual light settings and the audio settings for the virtual user vehicle 132. For example, the interaction may include a selection of a relax mode that may dim the cabin lights to 30%, tint the windows, change the color of the cabin lights to lavender light, recline a seat, and begin playing jazz music for the for the virtual user vehicle 132. Accordingly, the interaction may include any number of the virtual properties 226.

In addition to the user 220 having a virtual user vehicle 132, the metaverse environment 250 may be accessible by participants. A plurality of participants 234, shown in FIG. 2B may be other users that are associated with the user 220. For example, the plurality of participants 234 may be in a group with the user 220 based on a shared status, an association with an entity (e.g., vehicle manufacturer, employer, etc.), a vehicle type, a social bond, a subscription to the metaverse environment 250, an incentive conferred by the entity, or a loyalty program, among others.

The participants of the plurality of participants 234 are associated with virtual participant vehicles. In a similar manner as the virtual user vehicle 132 replicating the physical user vehicle 102, the virtual participant vehicles may replicate physical participant vehicles associated with the plurality of participants 234. Accordingly, the participants of the plurality of participants 234 may be biological entities. In another embodiment, the participants of the plurality of participants 234 may be non-player characters (NPCs) that are positioned the in the metaverse environment 250. Therefore, some participants of the plurality of participants 234 may have physical participant vehicles that correspond to the virtual participant vehicles, while other participants of the plurality of participants 234 are only associated with virtual participant vehicles.

At block 304, the method 300 includes the interaction module 144 receiving an interaction that alters a virtual property 224 of a number of virtual properties 226. The user 220 may generate an interaction using the client computer 104. The interaction changes the state of the virtual user vehicle 132 by altering the virtual property 224 of the virtual user vehicle 132 from the current state. The current state of the virtual user vehicle 132 may be displayed on the display device(s) 120 of the physical user vehicle 102 or on the display 222 of the client computer 104.

The interaction may include the user 220 selecting the virtual property 224. For example, the number of virtual properties 226 may be represented as icons, radio buttons, toggle switches, check boxes, dialog boxes, pop-up menus, drop down menus, among other graphical interfaces. The virtual properties 226 may allow the user 220 to select a value for the virtual property 224 from a range of values and include, for example, a slide control that allows the user 220 to adjust the virtual properties 226. The interaction may be a natural language input from the user 220. The interaction module 144 may receive the interaction from the physical user vehicle 102 or the client computer 104 when the metaverse application 106 is hosted thereon. In another embodiment, the interaction module 144 may receive the interaction via the network 154 with the communication unit 140.

In some embodiments, the interaction module 144 identify the virtual property 224 from the interaction and alter the virtual user vehicle 132. As discussed above, the virtual user vehicle 132 may reflect a current state of the physical user vehicle 102. In response to receiving the interaction, the interaction module 144 affects the changes of the interaction so that the one or more virtual properties of the interaction are altered for the virtual user vehicle 132. Because the virtual user vehicle 132 is displayed in the metaverse environment 250, the user 220 is able to visualize the one or more virtual properties as applied to the virtual user vehicle 132. In one embodiment, in response to the virtual property 224 be selected by the user 220 on the client computer 104, the interaction module 144 causes the metaverse environment 250 to be displayed on the display 222 with the virtual property 224 applied to the virtual user vehicle 132. Thus, the interaction module 144 receives the interaction and alters the metaverse environment 250 accordingly.

At block 306, the method 300 includes the score module 146 assigning a community value to the interaction based on a comparative baseline. The community value is a comparative structure that allows the changes to the virtual user vehicle to be gauged relative to the comparative baseline. The comparative baseline may be based on features of the metaverse environment 250, achievements of the user 220, or the standings of the participants and/or virtual participant vehicles, among others.

In one embodiment, the comparative baseline is based on the property level associated with the virtual property 224. For example, the virtual property 224 may be associated with a property level 228 of a total number of property levels 230. The property level 228 may be based on the standing of the user 220, the complexity of the virtual property 224, or parameters of the virtual property 224. For example, the if the virtual property 224 is associated with the lighting of the virtual user vehicle 132, the parameters may include color scheme of the lighting, brightness of the lighting, number and/or location of illuminated lights of the virtual user vehicle 132, etc. Continuing the example, the virtual property 224 may have a property level 228 that is a level 2 a total number of property levels 230 that includes four levels. In this manner, the total number of property levels 230 is a comparative baseline for the virtual property 224. Accordingly, the community value may be calculated based on a comparative baseline that is a ratio of the property level 228 to the total number of property levels 230.

In another embodiment, the user 220 may be able to compare their virtual user vehicle 132 to the virtual participant vehicles in the metaverse environment 250. In this example, the comparative baseline may be applied to the property levels of the virtual participant vehicles. If the user 220 has a ratio of a property level 228 that is a level 2 a total number of property levels 230 that is four, while another participant has a ratio that is lower, then the community value of the user 220 may be weighted to increase the community value. Alternatively, if the other participant as a ratio that is higher than that of the user 220, then the community value of the user 220 may be weighted to decrease the community value.

In yet another embodiment, the score module 146 may calculate a virtual user score 232 for the user 220 based on the number of virtual properties of the virtual user vehicle 132. The virtual user score 232 may be based on rankings, user activity in the metaverse environment 250, etc. The comparative baseline may be based on the virtual user score 232 relative to the virtual participant scores associated with the plurality of participants 234. The virtual participant scores of the plurality of participants 234 are calculated in a similar manner as the virtual user score 232 so that the scores are comparable. For example, the participants of the plurality of participants 234 may have virtual participant scores based on one or more property levels of the plurality of property levels associated with the virtual participant vehicles.

The comparative baseline may be based on the virtual participant scores of the plurality of participants 234. For example, the community value may be a ranking of the virtual user score 232 relative to the virtual participant scores of the plurality of participants 234. As another example, the comparative baseline may be a central value (e.g., average, median, mean, etc.) based on the virtual participant scores of the plurality of participants 234. Accordingly, the community value may be based on the virtual user score 232 relative to the central value.

At block 308, the method 300 includes the execution module 148 identifying a physical property of the physical user vehicle 102 corresponding to the virtual property of the number of virtual properties 226. The virtual properties 226 may correspond to physical properties controlled, in part, by the vehicle systems 110 including the navigation system 112, the light system 114, the audio system 116, and the infotainment system 118. For example, if the virtual property 224 affects lighting, the corresponding physical property may be a parameter of the light system 114. Accordingly, the execution module 148 may identify the physical property of the physical user vehicle 102 based on a type or category of the virtual property 224.

At block 310, the method 300 includes the execution module 148 altering the physical property of the physical user vehicle 102 based on the community value. For example, the execution module 148 may cause the ECU 108 or the vehicle systems 110 to apply the identified physical property of the physical user vehicle 102 to correspond to the virtual user vehicle 132.

As one example, if the user 220 selects the virtual property 236 of the virtual properties 226 to reduce the volume of audio. The virtual property 236 may be represented on the virtual user vehicle 132 with icons 252. Additionally or alternatively, the volume of audio playing through speakers (not shown) of the client computer 104, may be reduced. At block 308, the execution module 148 may identify parameters of the audio system 116 as corresponding to the virtual property 236 of the number of virtual properties 226. Accordingly, at block 310, the execution module 148 may reduce the volume in the physical user vehicle 102 accordingly, shown in FIG. 2A with dashed marks 204 using the audio system 116.

Altering the physical property is based on the community value. For example, based on the community value, enhancements and increased availability may be made available to the user 220. For example, altering the physical property of the physical user vehicle 102 may include providing the user 220 access to the physical property based on a timing parameter. For example, the user 220 may be able to affect changes to the physical user vehicle 102 for a predetermined amount of time and/or have earlier access to the physical property via the metaverse environment 250 than the plurality of participants 234, among others.

As one example, physical properties may be associated with a predetermined amount of time. A higher community value may cause the execution module 148 to provide the user 220 with an amount of time including more time than a predetermined amount of time. A lower community value may cause the execution module 148 to provide the user 220 an amount of time with less time with the physical property than the predetermined amount of time. Accordingly, changes in the physical world may be made based on the community value. Furthermore, the manner in which the physical property of the physical user vehicle 102 is altered may act as an incentive. For example, the community value may act as an incentive for interacting with the virtual user vehicle 132 relative to the plurality of participants 234 when the comparative baseline is based on a comparison with the plurality of participants 234. Thus, the systems and methods described herein may provide the user 220 with interactions that gamify the metaverse environment 250.

Figure 4:
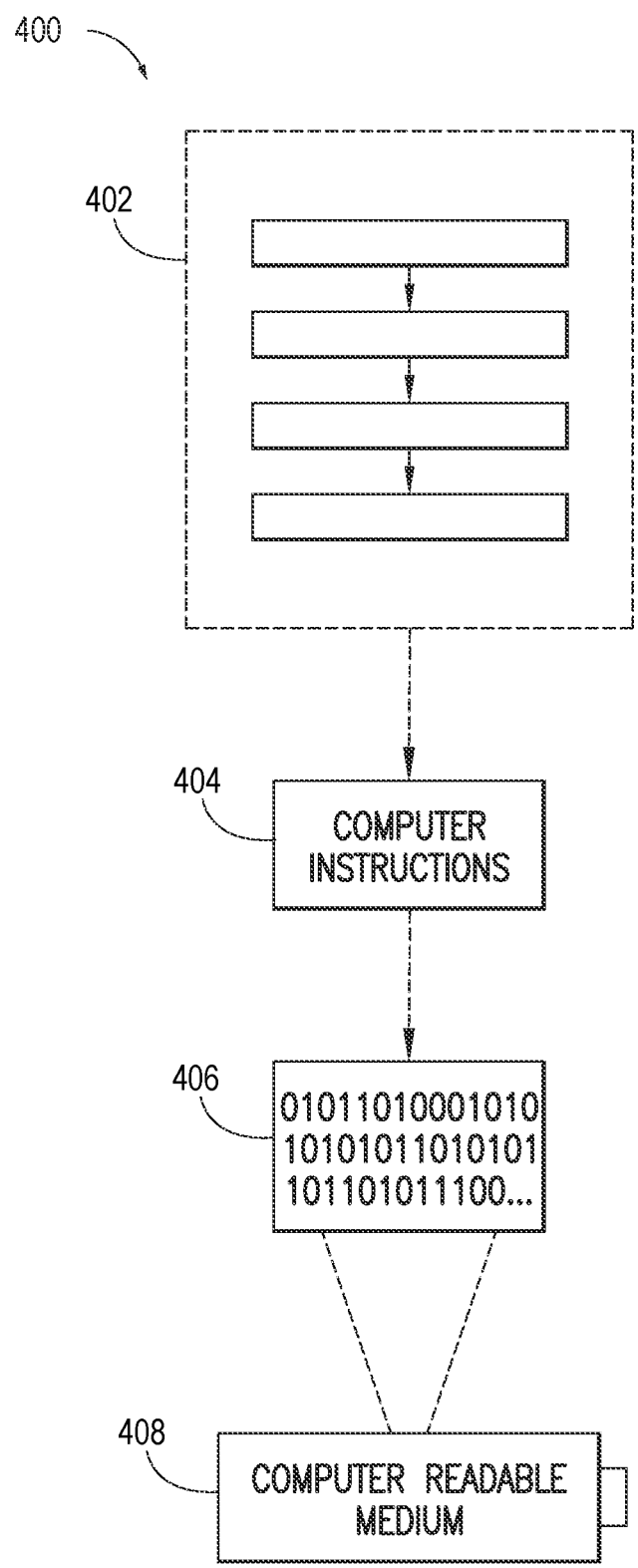
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein.

In this implementation 400, the processor-executable computer instructions 404 may be configured to perform a method 402, such as the method 300 of FIG. 3. In another aspect, the processor-executable computer instructions 404 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for gamification in a metaverse, comprising:
a processor; and
a memory storing instructions that when executed by the processor cause the processor to:
generate a metaverse environment with a metaverse application at a client computer of a user, wherein the metaverse environment includes a virtual user vehicle that replicates a physical user vehicle associated with the user, and wherein the virtual user vehicle is associated with a number of virtual properties;
receive an interaction that alters a virtual property of the number of virtual properties at the client computer;
assign a community value to the interaction based on a comparative baseline that is a ratio of a property level of a plurality of property levels to a total number of property levels;
identify a physical property of the physical user vehicle corresponding to the altered virtual property of the number of virtual properties of the virtual user vehicle; and
alter, via a vehicle system, the identified physical property of the physical user vehicle to replicate the altered virtual property of the virtual user vehicle based on the community value.

2. The system of claim 1, wherein the altered virtual property is associated with the property level of the plurality of property levels, and wherein the comparative baseline is based on the property level associated with the altered virtual property.

3. The system of claim 1, wherein the metaverse environment is accessible by a plurality of participants, and wherein participants of the plurality of participants have virtual participant vehicles that replicate physical participant vehicles, and wherein the participants have virtual participant scores based on one or more property levels of a plurality of property levels associated with the virtual participant vehicles.

4. The system of claim 3, wherein the comparative baseline is based on the altered virtual property associated with the virtual user vehicle relative to the one or more property levels of the plurality of property levels associated with the virtual participant vehicles.

5. The system of claim 3, wherein the instructions when executed by the processor further cause the processor to:
calculate a virtual user score for the user based on the number of virtual properties, wherein the comparative baseline is based on the virtual user score relative to the virtual participant scores associated with the participants of the of the plurality of participants.

6. The system of claim 1, wherein altering the physical property of the physical user vehicle includes providing the user access to the physical property based on a timing parameter.

7. The system of claim 1, wherein the altered virtual property changes a feature of the virtual user vehicle, and wherein altering the physical property of the physical user vehicle includes causing the vehicle system of the physical user vehicle to alter the physical property of the physical user vehicle.

8. The system of claim 1, wherein the metaverse application generates the metaverse environment via a metaverse server coupled to the client computer through a network.

9. A method for gamification in a metaverse, comprising:
generating a metaverse environment with a metaverse application at a client computer of a user, wherein the metaverse environment includes a virtual user vehicle that replicates a physical user vehicle associated with the user, and wherein the virtual user vehicle is associated with a number of virtual properties;
receiving an interaction that alters a virtual property of the number of virtual properties at the client computer;
assigning a community value to the interaction based on a comparative baseline that is a ratio of a property level of a plurality of property levels to a total number of property levels;
identifying a physical property of the physical user vehicle corresponding to the altered virtual property of the number of virtual properties of the virtual user vehicle; and
altering, via a vehicle system, the physical property of the physical user vehicle to replicate the altered virtual property of the virtual user vehicle based on the community value.

10. The method of claim 9, wherein the altered virtual property is associated with the property level of the plurality of property levels, and wherein the comparative baseline is based on the property level associated with the altered virtual property.

11. The method of claim 9, wherein the metaverse environment is accessible by a plurality of participants, and wherein participants of the plurality of participants have virtual participant vehicles that replicate physical participant vehicles, and wherein the participants have virtual participant scores based on one or more property levels of a plurality of property levels associated with the virtual participant vehicles.

12. The method of claim 11, wherein the comparative baseline is based on the altered virtual property associated with the virtual user vehicle relative to the one or more property levels of the plurality of property levels associated with the virtual participant vehicles.

13. The method of claim 11, further comprising:
calculate a virtual user score for the user based on the number of virtual properties, wherein the comparative baseline is based on the virtual user score relative to the virtual participant scores associated with the participants of the of the plurality of participants.

14. A non-transitory computer readable storage medium storing instructions that when executed by a computer, which includes a processor perform a method, the method comprising:
generating a metaverse environment with a metaverse application at a client computer of a user, wherein the metaverse environment includes a virtual user vehicle that replicates a physical user vehicle associated with the user, and wherein the virtual user vehicle is associated with a number of virtual properties;
receiving an interaction that alters a virtual property of the number of virtual properties at the client computer;
assigning a community value to the interaction based on a comparative baseline that is a ratio of a property level of a plurality of property levels to a total number of property levels;
identifying a physical property of the physical user vehicle corresponding to the altered virtual property of the number of virtual properties of the virtual user vehicle; and
altering, via a vehicle system, the physical property of the physical user vehicle to replicate the altered virtual property of the virtual user vehicle based on the community value.

15. The non-transitory computer readable storage medium of claim 14, wherein the altered virtual property is associated with the property level of the plurality of property levels, and wherein the comparative baseline is based on the property level associated with the altered virtual property.

16. The non-transitory computer readable storage medium of claim 14, wherein the metaverse environment is accessible by a plurality of participants, and wherein participants of the plurality of participants have virtual participant vehicles that replicate physical participant vehicles, and wherein the participants have virtual participant scores based on one or more property levels of a plurality of property levels associated with the virtual participant vehicles.

17. The non-transitory computer readable storage medium of claim 16, wherein the comparative baseline is based on the altered virtual property associated with the virtual user vehicle relative to the one or more property levels of the plurality of property levels associated with the virtual participant vehicles.

\* \* \* \* \*